Aug. 14, 1934.   R. J. ALDEN   1,970,483
DECELEROMETER INDICATING INSTRUMENT
Original Filed Feb. 13, 1929
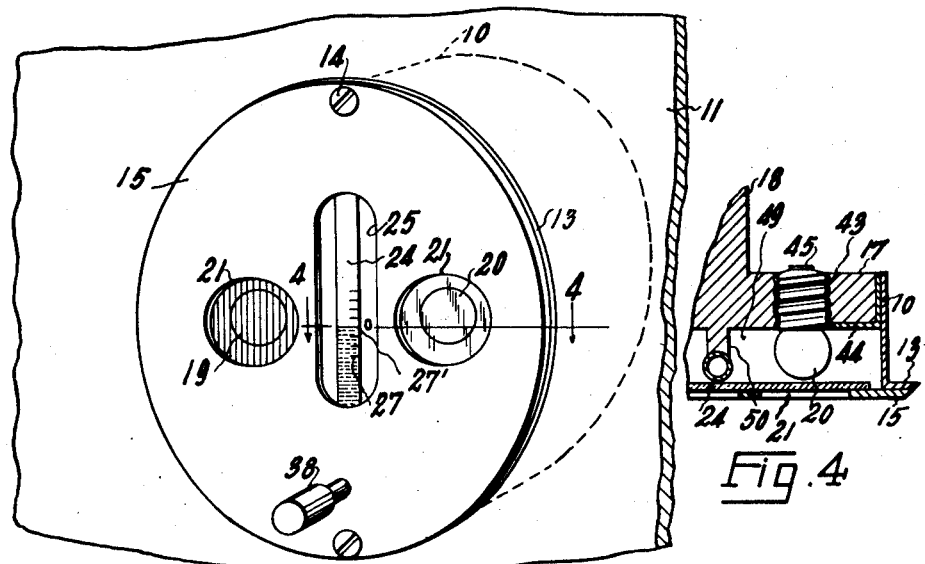
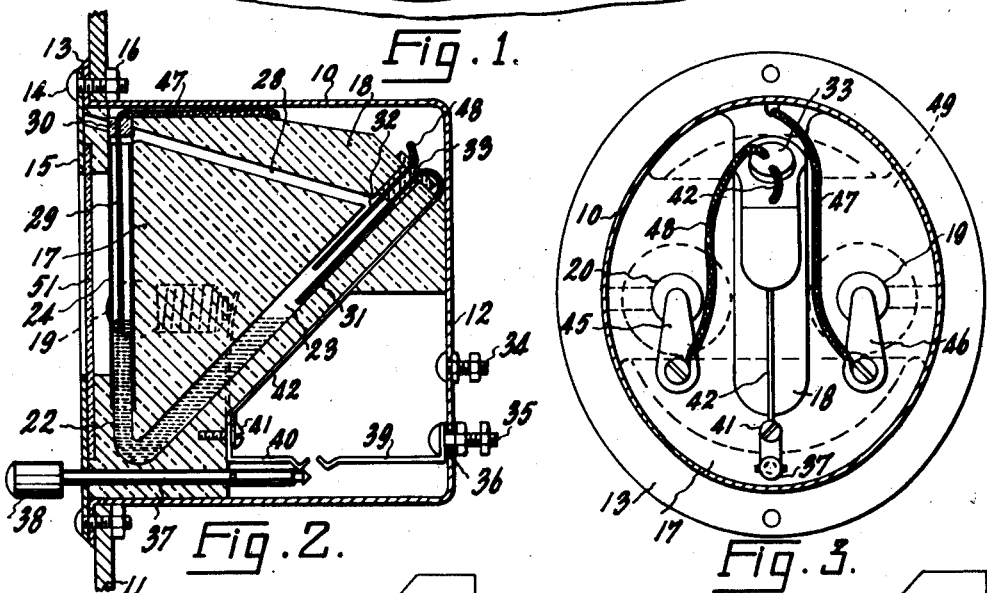
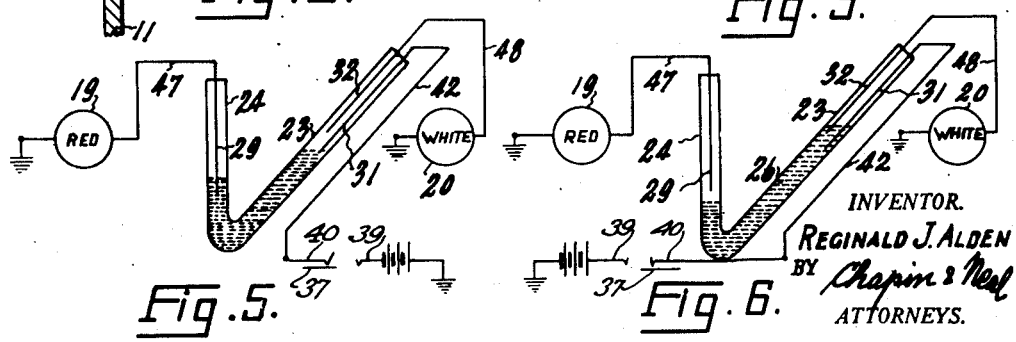
INVENTOR.
REGINALD J. ALDEN
BY Chapin & Neal
ATTORNEYS.

Patented Aug. 14, 1934

1,970,483

UNITED STATES PATENT OFFICE 1,970,483

DECELEROMETER INDICATING INSTRUMENT

Reginald J. Alden, Springfield, Mass.

Substitute of application Serial No. 339,648, February 13, 1929. This application March 31, 1931, Serial No. 526,603

3 Claims. (Cl. 177—311.5)

This invention relates to a decelerometer indicating instrument adapted to be mounted on an automobile to indicate to the driver by a test when the car is in motion whether or not the brakes are in proper condition.

The present application is a substitute for my previous application Serial No. 339,648, filed Feb. 13, 1929.

It is important that the brakes of an automobile be maintained in good condition so that they may be relied upon to check the speed of the automobile promptly and it is also important that the driver of the automobile shall know whether the brakes are in good condition and are capable of quickly retarding the speed of the automobile.

The present invention therefore relates to a simple and reliable brake condition indicator adapted to be mounted upon the instrument board of an automobile or other supporting structure of the automobile in position to be readily observed by the driver of the automobile.

An important feature of the present invention resides in signal means controlled by the deceleration of the automobile to give one signal when the brakes of the automobile fail to retard rapidly the speed of the automobile, and a different signal when the brakes are in good condition and act to check rapidly the speed of the automobile.

A further feature of the present invention resides in momentum actuated switch mechanism for controlling the display of the different signals; and in the compact construction and arrangement of parts whereby the signal devices and the momentum control switch for actuating the signal devices are housed in a casing which may be readily installed upon an automobile in proper operating condition.

Still a further feature of the present invention resides in a combined signal device and graduated indicator adapted to give signals showing the condition of the automobile brakes and also to indicate a measure of the automobile deceleration.

Other features of the invention and novel combination of parts in addition to the above will be hereinafter described in connection with the accompanying drawing which illustrates one good practical form of the invention.

In the drawing:

Fig. 1 is a front perspective view of the indicator device of the present invention mounted upon the instrument board of an automobile;

Fig. 2 is a vertical sectional view through the indicator device of Fig. 1;

Fig. 3 is a rear elevation of the device of Fig. 1, the rear wall of the casing being removed;

Fig. 4 is a sectional view taken on the line 4—4 of Fig. 1;

Fig. 5 is a diagrammatic view showing the relation of the parts when the automobile brakes fail to stop the automobile quickly; and Fig. 6 is a view similar to Fig. 5 showing the relation of the parts when the automobile brakes are in good condition and stop the automobile quickly.

In the embodiment of the invention illustrated, the various parts of the indicator device are shown as housed in a casing 10 which may have the elliptical construction best shown in Fig. 3 and is adapted to be mounted within a correspondingly shaped opening formed in the instrument board 11 of an automobile.

The rear end of the casing 10 is preferably closed by a wall 12 and at the forward end of the casing is provided a laterally extending flange 13 adapted to rest against the face of the instrument board 11, the construction being such that the casing may be rigidly secured upon the instrument board of the automobile by the bolts 14 which extend through the front face plate 15 of the casing and through the instrument board 11, and may be provided at their rear ends with the nuts 16.

The signal devices for indicating the condition of the automobile brakes may constitute different colored electric lights mounted within the casing just described and having associated therewith gravity control switch mechanism which will cause one light to be displayed when the automobile's speed is quickly retarded, and the other light to be displayed when the automobile's speed is more slowly retarded. These electric lights and switch control mechanism are conveniently mounted upon a block of insulating material such as bakelite which is preferably shaped to fit snugly within the casing 10. The forward portion of this insulating block preferably has the form of a relatively thick disk 17 adapted to fit snugly within the forward portion of the casing 10, and at the rear face of this disk portion 17 is a rearwardly extending portion 18 of reduced width, the arrangement being such that the rear end of the portion 18 of the insulating block abuts against the rear wall 12 of the casing, as shown in Fig. 2.

The different colored signal lights 19 and 20 are shown as mounted in sockets or recesses formed in the forward portion of the bakelite block, the arrangement being such that these lights may be observed through openings 21 formed in the face plate 15 of the casing.

Various forms of switch mechanism adapted to be actuated by the deceleration of the automobile may be employed to control the display of the signal lights 19 and 20, and in the construction shown a mercury tube is employed to this end having the angularly disposed legs 22 and 23, the leg 22 being disposed in approximate vertical position, while the leg 23 slopes upwardly from the lower end of the leg 22, as shown. Both legs of the mercury tube are conveniently formed by drilling a vertical and an inclined hole in the bakelite block as will be apparent from Fig. 2, and the vertical leg is preferably enlarged slightly throughout the greater portion of its length to receive the glass tube 24 which may be observed through an opening 25 formed in the face plate 13. The arrangement is such that the height of the mercury 26 in the glass tube 24 may be observed and any variation in this height during the application of the automobile brakes may be noted by observing the graduations of the scale 27 adjacent the glass tube. The scale 27 has a zero marking 27' at which the level of the mercury in the tube 24 should be when making a test of brake efficiency. The instrument should be so mounted in the car that the mercury will be at this level when the car is in its horizontal position as on a level road.

It will be apparent from the construction just described that when the automobile is not moving, or is moving at a constant rate of speed, the mercury will stand at the same height in the legs 22 and 23 of the tube, as shown in Fig. 1, but if the speed of the automobile is decelerated the momentum of the mercury will cause the mercury to rise in the inclined leg 23 of the mercury tube and the greater the deceleration of the automobile, the higher the mercury will rise in this leg. It is desirable to permit a free passage of air between the upper ends of the legs 22, 23, and this is secured by providing a drill hole or passage 28 formed in the upper portion of the bakelite block, as shown.

In order that the mercury within the mercury tube may control the signal lights 19, 20, conductor wires, in accordance with the present invention, are mounted within the legs 22 and 23 of the mercury tube. In the embodiment of the invention illustrated, a conductor wire 29 extends downwardly within the glass tube 24 far enough to engage the mercury when the mercury is in an undisturbed condition and seeks its level in the two legs of the mercury tube. This contact wire 29 may be supported at the desired height within the glass tube by mounting it in a block 30 formed of porcelain, plaster of Paris, or other insulating material which is shaped to snugly fit in the upper end of the vertical leg.

The inclined leg 23, in the construction shown, is provided with two conductor wires 31 and 32, which are supported within the leg 23 by a block of insulating material 33 which may be snugly fitted in the upper end of the leg 23. The contact wires 31 and 32 are so positioned within the leg 23 that they are not engaged by the mercury when the same rests in an undisturbed position as in Fig. 2. One of these wires, however (for example 31), is so positioned that as the mercury falls in the vertical leg 22 and rises in the inclined leg 23 it will contact with the lower end of the wire 31 before it moves out of engagement with the lower end of the wire 29 to thereby close the electric circuit between these two wires. This will serve to illuminate the danger light 19 which may be a red light and will indicate to the automobile driver that the brakes are not retarding the speed of the automobile with sufficient promptness. If the mercury rises still higher in the inclined leg 23 due to a rapid deceleration of the automobile, it will move downwardly out of engagement with the wire 29 in the vertical leg and will reach a sufficient height in the inclined leg to bridge the gap between the wires 31 and 32 to thereby complete the electric circuit which controls the light 20 and thus serve to indicate to the automobile driver that the automobile brakes are in good condition, and check the speed of the automobile with the desired rapid deceleration.

The wiring of the present device for giving the desired control of the signal lights 19 and 20 may be as follows. The metal casing 10 in which the various parts above described are housed may be grounded by securing a grounded wire not shown to the contact bolt 34. The contact bolt 35, which is insulated from the metal casing by the insulating material 36, may be connected to a wire leading to the usual automobile storage battery. A hand operated switch is preferably provided for controlling the supply of current to the indicating device, and this switch, in the construction shown, constitutes a rod 37 mounted for sliding movement in the lower portion of the bakelite block and this rod is provided at its forward end with a head 38 adapted to be engaged between the fingers to shift this rod to and from the switch closed position, as will be apparent from Fig. 2. The rear portion of the rod 37 is adapted to open and close the circuit between the contact members 39 and 40, one of which is secured in place by the contact bolt 35 and the other of which is secured to the rear face of the portion 17 of the bakelite block by a screw 41. An electric conductor 42 leads from the screw 41 to the contact wire 31.

Each of the electric lights 19 and 20 is mounted as usual in a threaded socket 43 which is preferably provided with a laterally extending portion 44 adapted to complete the circuit between the socket 43 and a wall of the casing 10, as will be apparent from Fig. 4. Upon the rear wall of the disk-like portion 17 of the block of insulating material are mounted the contact plates 45 and 46 adapted to engage the contact point at the rear end of each of the electric lights. A conductor wire 47 leads from the contact plate 46 to the wire 29 within the glass tube and the conductor wire 48 leads from the contact plate 45 to the contact wire 32 in the inclined leg.

As a result of the electric connection just described, it follows that when the mercury rises in the inclined leg to the position in which it is shown in Fig. 5, the circuit will be closed through the light 19 which may be a red or danger light; and when the mercury rises a greater distance within the inclined leg to the position in which it is shown in Fig. 6, the circuit to the light 19 will be broken and the circuit will be closed for the light 20 which may be a white light that will indicate that the automobile brakes are in good condition and will rapidly check the speed of the automobile.

The block of bakelite or other insulating material may have its front face cut away somewhat adjacent each electric light, as indicated by 49, as will be apparent from Fig. 4, the construction being such that a vertical rib 50 is provided at the rear of the glass tube and serves to prevent the rays of light passing from one cutaway portion 49 to the other. A glass plate 51 is preferably confined between the front face of the bakelite block and the cover plate 15 and serves to protect the electric lights and the glass tube 26.

It will be seen from the foregoing that the indicating device of the present invention operates to display one signal when the brakes of the automobile fail to rapidly check the speed of the automobile, and to display a different signal when the brakes are in good condition and operate to quickly retard the speed of the automobile. It will also be seen that the rate of deceleration of the automobile upon application of the brakes may be readily noted by observing the position of the mercury in the graduated glass tube 24. While mercury has been described herein as constituting a momentum controlled switch for the signal lights, it will be apparent that other forms of switches adapted to be actuated by a deceleration of the automobile may be employed, and if desired liquids other than mercury which are capable of closing the circuit between the contact wires described may be used in the tube 22, 23 in place of mercury.

After the condition of the brakes of an automobile have been determined through the use of the present indicating device, the switch rod 37 may be pulled outward to the position in which it is shown in Fig. 2 to cut off the supply of current to the indicating device and render the same inoperative until a further reading is desired. When an automobile is being driven upon wet, slippery streets so that the wheels fail to promptly retard the movement of the automobile when the brakes are applied, it may be desirable to maintain the present indicating device in its operative condition, so that the reappearance of the danger signal light 19 will repeatedly warn the driver of the automobile that the speed of the automobile cannot be promptly checked.

The instrument boards in different makes of automobiles may be inclined at slightly different angles, but the indicator devices of the present invention may be constructed to meet this condition by varying the position of the contact wires within the mercury tube and by varying the zero position of the graduations 27.

In the present embodiment, the instrument is shown as mounted in fixed position on the car which will be sufficient for making a test of the brake system efficiency on a level road. Obviously the instrument may be carried on an adjustable mounting if desired, which will permit the mercury level in tube 24 to be set at its zero position either by hand or automatically, in which case tests of braking efficiency may be made on an inclined road as well as on the level.

It is generally considered that the brake system of an automobile is satisfactory if it will serve to stop a car within a distance of twenty-five feet when moving at a uniform rate of twenty miles per hour, and normally the switch points 29, 31, 32 relative to the mercury 26 in the tube 24 will be so adjusted as to show a red light when the car is not decelerated at the above rate and to show a white light when it is so decelerated. However, the switch points may be obviously varied in their positions so as to indicate the pressure or absence of any desired rate of deceleration as may be desired.

What I claim is:

1. A decelerometer which comprises a casing adapted to be mounted on the instrument board of a motor car, two signal lights mounted in said casing, electric circuits for the signal lights, a central switch for said circuits which comprises a tube formed of nonconducting material and having angularly disposed legs, a quantity of mercury confined in said tube and adapted to be shifted therein by changes in the speed of the car, a single contact member positioned in one leg of the tube normally in contact with the mercury and connected in circuit with one of said lights, a short contact member located in the second leg of the tube normally substantially spaced from the mercury and connected in the circuit of the second of said lights, and a long contact member located in the second leg of the tube normally spaced from but adjacent the mercury and connected in the circuit of both signal lights, the quantity of mercury and the length of said contacts being such that the movement of the mercury in the tube in response to a predetermined rate of deceleration of the car will shift the mercury into contact with said long contact member and maintain contact with said single contact member to close the circuit of the first signal light while movement of the mercury in the tube in response to a more rapid deceleration of the car will shift the mercury out of contact with said single contact member and into contact with both said short and long contact members to close the circuit of the second light.

2. A decelerometer which comprises a casing adapted to be mounted on the instrument board of a motor car, two signal lights mounted in said casing, electric circuits for the signal lights, a central switch for said circuits which comprises a tube formed of nonconducting material and having angularly disposed legs, a quantity of mercury confined in said tube and adapted to be shifted therein by changes in the speed of the car, a single contact member positioned in one leg of the tube normally in contact with the mercury and connected in circuit with one of said lights, a short contact member located in the second leg of the tube normally substantially spaced from the mercury and connected in the circuit of the second of said lights, and a long contact member located in the second leg of the tube normally spaced from but adjacent the mercury and connected in the circuit of both signal lights, the quantity of mercury and the length of said contacts being such that the movement of the mercury in the tube in response to a predetermined rate of deceleration of the car will shift the mercury into contact with said long contact member and maintain contact with said single contact member to close the circuit of the first signal light while movement of the mercury in the tube in response to a more rapid deceleration of the car will shift the mercury out of contact with said single contact member and into contact with both said short and long contact members to close the circuit of the second light, means to indicate the normal level of the mercury in one leg of the tube, and a manually operated switch controlling the circuit of both signal lights.

3. A decelerometer adapted to be mounted on the instrument board of a motor car which comprises two signal lights, electric circuits for the signal lights, a switch for said circuits comprising a receptacle formed of nonmetallic material, a quantity of mercury confined in said receptacle and adapted to be shifted therein by changes in the speed of the car, a contact member positioned in said receptacle normally in contact with the mercury and connected in circuit with one of said lights, a second contact member positioned in the receptacle normally out of contact with the mercury and connected in circuit with the second of said lights, and a third contact member positioned in the receptacle intermediate said first and second contact members, said third contact member being normally out of contact with the mercury and in circuit with both said lights, the quantity of mercury and the spacing of said contacts being such that the movement of the mercury in the receptacle in response to a predetermined rate of deceleration of the car will close the circuit between said first and third contact members while movement of the mercury in response to a more rapid deceleration of the car will open the circuit between said first and third contact members and close the circuit between said second and third contact members.

REGINALD J. ALDEN.